United States Patent
Yoshida

(10) Patent No.: US 11,663,150 B2
(45) Date of Patent: May 30, 2023

(54) FAULT TOLERANT SYSTEM

(71) Applicant: YOKOGAWA ELECTRIC CORPORATION, Tokyo (JP)

(72) Inventor: Yoshitaka Yoshida, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 121 days.

(21) Appl. No.: 17/166,499

(22) Filed: Feb. 3, 2021

(65) Prior Publication Data

US 2021/0303492 A1 Sep. 30, 2021

(30) Foreign Application Priority Data

Mar. 24, 2020 (JP) .............................. JP2020-053258

(51) Int. Cl.
G06F 13/24 (2006.01)
G06F 9/38 (2018.01)
G06F 9/455 (2018.01)

(52) U.S. Cl.
CPC ............ *G06F 13/24* (2013.01); *G06F 9/3869* (2013.01); *G06F 9/45558* (2013.01)

(58) Field of Classification Search
CPC ..... G06F 9/3869; G06F 9/45558; G06F 13/24
See application file for complete search history.

(56) References Cited

U.S. PATENT DOCUMENTS

| | | | | |
|---|---|---|---|---|
| 7,707,341 B1* | 4/2010 | Klaiber | ............... | G06F 9/45533 710/262 |
| 8,127,121 B2* | 2/2012 | Yates, Jr. | .............. | G06F 9/3861 712/203 |
| 2004/0015627 A1* | 1/2004 | Desoli | ................. | G06F 9/45504 710/260 |
| 2005/0268298 A1* | 12/2005 | Hunt | ..................... | G06F 9/5077 718/1 |
| 2011/0099357 A1* | 4/2011 | Loen | ..................... | G06F 9/4812 712/225 |
| 2013/0138760 A1* | 5/2013 | Tsirkin | .................... | G06F 9/544 709/213 |

FOREIGN PATENT DOCUMENTS

| | | |
|---|---|---|
| JP | 2010-26932 A | 2/2010 |
| JP | 2014-59749 A | 4/2014 |

* cited by examiner

*Primary Examiner* — Zachary K Huson
(74) *Attorney, Agent, or Firm* — Rankin, Hill & Clark LLP

(57) ABSTRACT

A fault tolerant system includes a primary virtual machine and a secondary virtual machine. The primary virtual machine includes a synchronizing information generator and a first interrupt blocker. The synchronizing information generator executes bytecode and outputs synchronizing information based on information related to the executed bytecode. The first interrupt blocker blocks an interrupt inputted from an external location. The secondary virtual machine includes a synchronous execution unit that executes the bytecode based on the synchronizing information and a second interrupt blocker that blocks the interrupt. When the interrupt is acquired, the synchronizing information generator executes the bytecode based on the interrupt. The first interrupt blocker outputs the interrupt to the synchronizing information generator when the interrupt is inputted during execution of an instruction, included in the bytecode, to accept the interrupt.

18 Claims, 6 Drawing Sheets

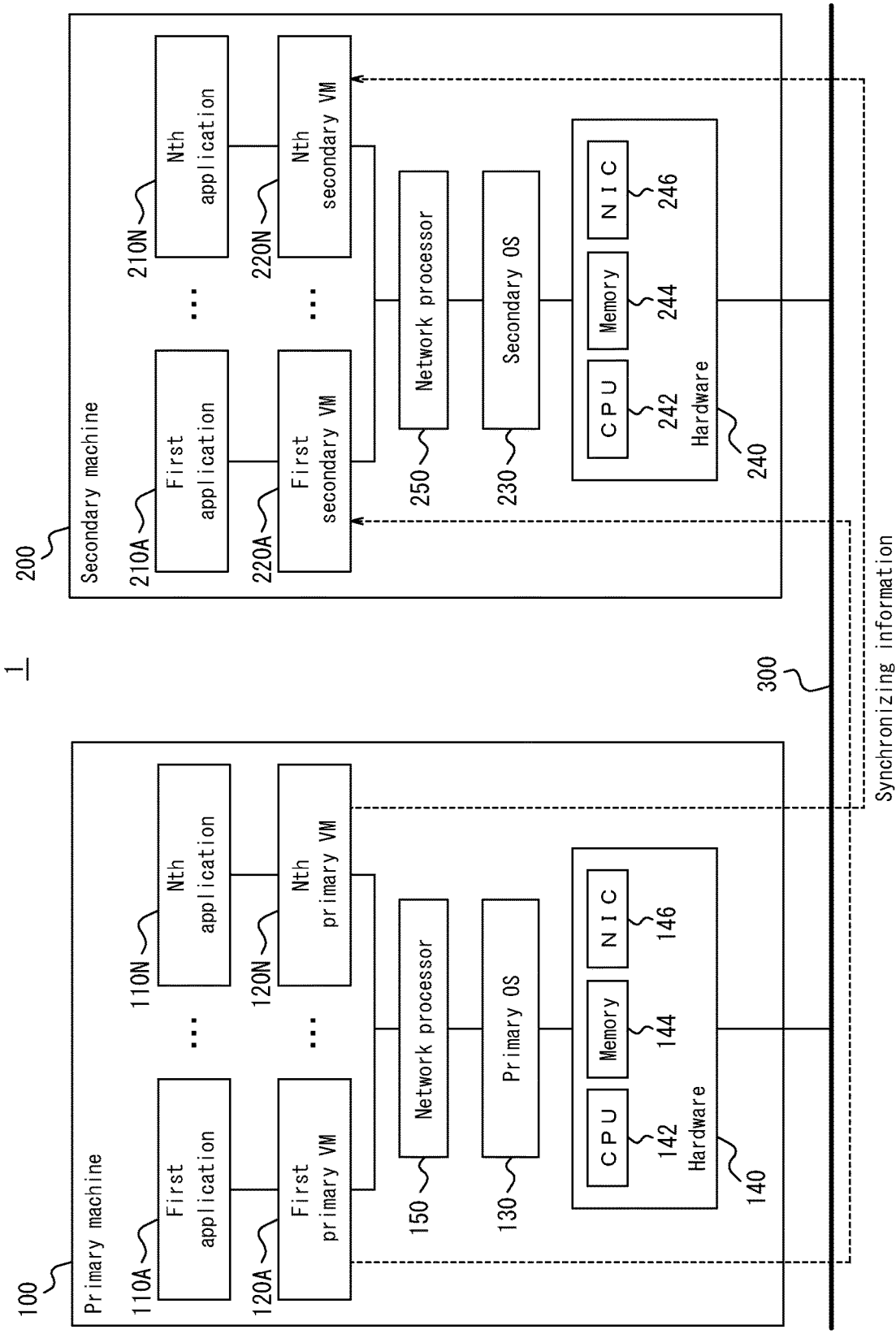

FAULT TOLERANT SYSTEM

CROSS-REFERENCE TO RELATED APPLICATION

The present application claims priority to Japanese Patent Application No. 2020-053258 filed Mar. 24, 2020, the entire contents of which are incorporated herein by reference.

TECHNICAL FIELD

The present disclosure relates to a fault tolerant system.

BACKGROUND

A fault tolerant system that can accurately transmit a pseudo interrupt timing inputted by a primary virtual machine to a secondary virtual machine and can input a pseudo interrupt on the secondary virtual machine at the same timing is known. For example, see patent literature (PTL) 1.

CITATION LIST

Patent Literature

PTL 1: JP 2014-59749 A

SUMMARY

A fault tolerant system according to an embodiment includes a primary virtual machine comprising a synchronizing information generator configured to execute bytecode and output synchronizing information based on information related to the bytecode that is executed and a first interrupt blocker configured to block an interrupt inputted from an external location; and a secondary virtual machine comprising a synchronous execution unit configured to execute the bytecode based on the synchronizing information and a second interrupt blocker configured to block the interrupt. When the interrupt is acquired, the synchronizing information generator is configured to execute the bytecode based on the interrupt. The first interrupt blocker is configured to output the interrupt to the synchronizing information generator when the interrupt is inputted during execution of an instruction, included in the bytecode, to accept the interrupt.

In the fault tolerant system according to an embodiment, the bytecode may include a first instruction to accept the interrupt during execution and a second instruction not to accept the interrupt during execution. The first interrupt blocker may be configured to output the interrupt to the synchronizing information generator when the interrupt is inputted during execution of the first instruction by the synchronizing information generator and not to output the interrupt to the synchronizing information generator when the interrupt is inputted during execution of the second instruction by the synchronizing information generator.

In the fault tolerant system according to an embodiment, the interrupt may include a first interrupt accepted by the first instruction and a second interrupt not accepted by the first instruction. The first interrupt blocker may be configured to block the second interrupt regardless of which instruction is being executed by the synchronizing information generator and to block the first interrupt during execution of the second instruction by the synchronizing information generator.

In the fault tolerant system according to an embodiment, the synchronizing information may include information specifying the bytecode executed by the synchronizing information generator.

In the fault tolerant system according to an embodiment, the bytecode may include an input instruction for acquiring data from an external location.

The synchronizing information generator may be configured to output information related to the data acquired by executing the input instruction as the synchronizing information.

In the fault tolerant system according to an embodiment, the interrupt may include a timer process.

In the fault tolerant system according to an embodiment, the interrupt may include a network transmission and reception process.

BRIEF DESCRIPTION OF THE DRAWINGS

In the accompanying drawings:

FIG. 7 is a block diagram illustrating an example configuration of a fault tolerant system according to another embodiment.

DETAILED DESCRIPTION

Figure 1:
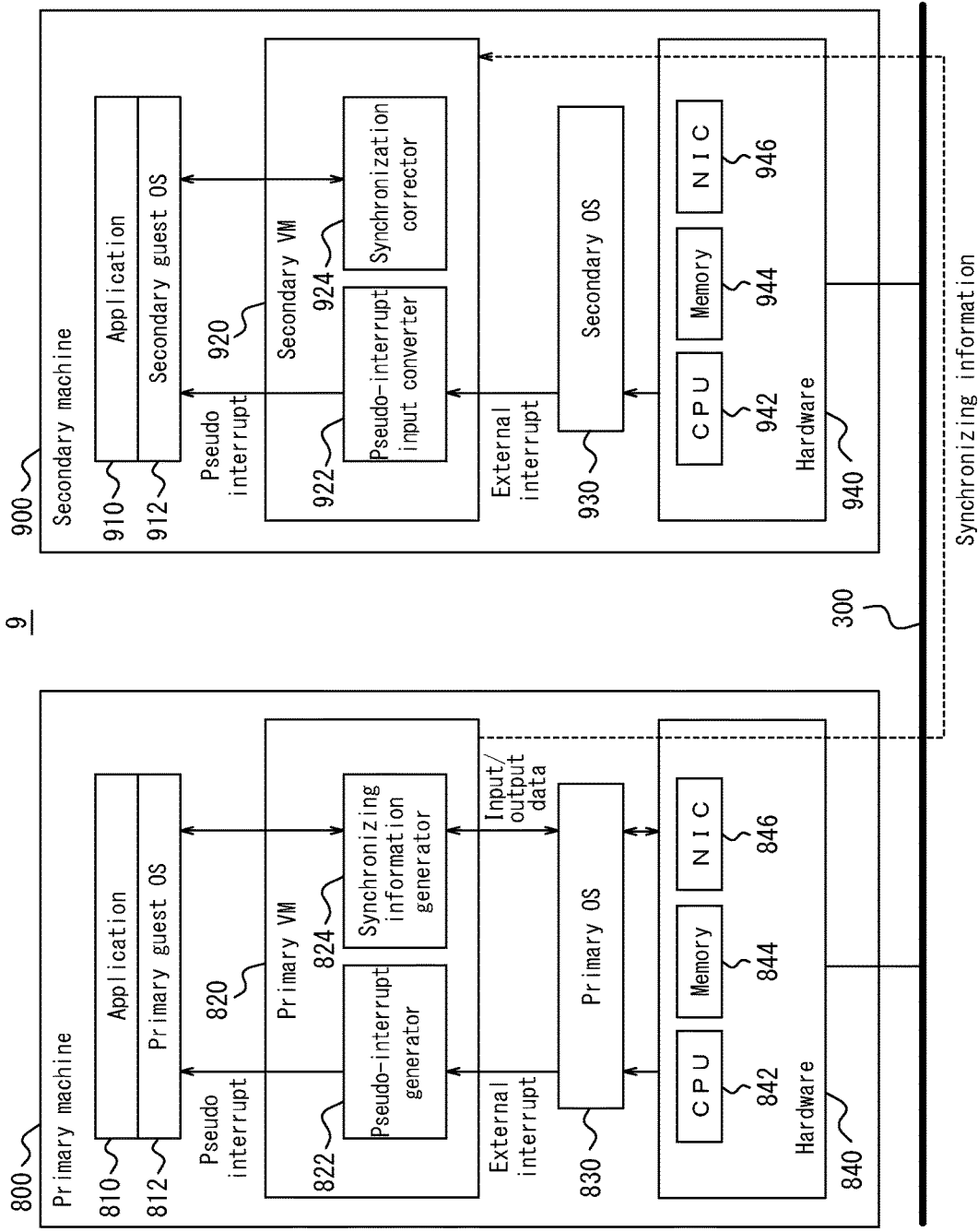
FIG. 1 is a block diagram illustrating a fault tolerant system according to a comparative example.

Demand exists for a fault tolerant system that operates with a low load. It would therefore be helpful to provide a fault tolerant system that can operate with a low load.

A fault tolerant system according to an embodiment includes a primary virtual machine comprising a synchronizing information generator configured to execute bytecode and output synchronizing information based on information related to the bytecode that is executed and a first interrupt blocker configured to block an interrupt inputted from an external location; and a secondary virtual machine comprising a synchronous execution unit configured to execute the bytecode based on the synchronizing information and a second interrupt blocker configured to block the interrupt. When the interrupt is acquired, the synchronizing information generator is configured to execute the bytecode based on the interrupt. The first interrupt blocker is configured to output the interrupt to the synchronizing information generator when the interrupt is inputted during execution of an instruction, included in the bytecode, to accept the interrupt. This configuration can reduce the amount of processing for redundancy or the program size. Consequently, the fault tolerant system can operate with a low load.

In the fault tolerant system according to an embodiment, the bytecode may include a first instruction to accept the interrupt during execution and a second instruction not to accept the interrupt during execution. The first interrupt blocker may be configured to output the interrupt to the synchronizing information generator when the interrupt is inputted during execution of the first instruction by the synchronizing information generator and not to output the interrupt to the synchronizing information generator when the interrupt is inputted during execution of the second instruction by the synchronizing information generator. This configuration can implement redundancy while accepting necessary interrupts, without performing complicated timing adjustments. Consequently, the fault tolerant system can operate with a low load.

In the fault tolerant system according to an embodiment, the interrupt may include a first interrupt accepted by the first instruction and a second interrupt not accepted by the first instruction. The first interrupt blocker may be configured to block the second interrupt regardless of which instruction is being executed by the synchronizing information generator and to block the first interrupt during execution of the second instruction by the synchronizing information generator. This configuration can easily block the second interrupt. In other words, the processing load of the interrupt blocker is reduced. Consequently, the fault tolerant system can operate with a low load.

In the fault tolerant system according to an embodiment, the synchronizing information may include information specifying the bytecode executed by the synchronizing information generator. This configuration enables the interrupt blocker to judge easily whether to block the first interrupt based on the synchronizing information. In other words, the processing load of the interrupt blocker is reduced. Consequently, the fault tolerant system can operate with a low load.

In the fault tolerant system according to an embodiment, the bytecode may include an input instruction for acquiring data from an external location. The synchronizing information generator may be configured to output information related to the data acquired by executing the input instruction as the synchronizing information. With this configuration, the secondary virtual machine can acquire data inputted from the external location based on the synchronizing information. Accordingly, the secondary machine that includes the secondary virtual machine does not need to communicate with an external location. Consequently, the load of the fault tolerant system 1 is reduced, so that the fault tolerant system 1 can operate with a low load.

In the fault tolerant system according to an embodiment, the interrupt may include a timer process. This configuration enables the fault tolerant system to accept necessary interrupts rather than unconditionally blocking interrupts. The usefulness of the fault tolerant system consequently increases.

In the fault tolerant system according to an embodiment, the interrupt may include a network transmission and reception process. This configuration enables the fault tolerant system to accept necessary interrupts rather than unconditionally blocking interrupts. The usefulness of the fault tolerant system consequently increases.

According to the present disclosure, a fault tolerant system that can operate with a low load is provided.

Embodiments of the present disclosure are described below with reference to the drawings. Identical reference signs in the drawings indicate identical or equivalent constituent elements.

Comparative Example

As illustrated in FIG. 1, a fault tolerant system 9 according to a comparative example includes a primary machine 800 and a secondary machine 900. The primary machine 800 and the secondary machine 900 are communicably connected via a network 300. The primary machine 800 and the secondary machine 900 both execute the same processing. When a fault occurs in the primary machine 800, the secondary machine 900 inherits the processing. In this way, the processing continues in the fault tolerant system 9 overall.

The primary machine 800 includes hardware 840. A primary operating system (OS) 830 or a hypervisor runs on the hardware 840. The primary machine 800 runs a primary virtual machine (VM) 820 on the primary OS 830 or the hypervisor. The primary VM 820 includes a pseudo interrupt generator 822 and a synchronizing information generator 824. The primary machine 800 runs a primary guest OS 812 and an application 810 on the primary VM 820.

The secondary machine 900 includes hardware 940. A secondary OS 930 or a hypervisor runs on the hardware 840. The secondary machine 900 runs a secondary VM 920 on the secondary OS 930 or the hypervisor. The secondary VM 920 includes a pseudo interrupt input converter 922 and a synchronization corrector 924. The secondary machine 900 runs a secondary guest OS 912 and an application 910 on the secondary VM 920.

The primary machine 800 and the secondary machine 900 run the application 810 and the application 910 so that the processing of the application 810 and the processing of the application 910 are the same processing. With this configuration, the secondary machine 900 can inherit the processing when a fault occurs in the primary machine 800. The applications 810 and 910 are simply referred to as the application when no distinction need be made.

The hardware 840 includes a central processing unit (CPU) 842, a memory 844, and a network interface controller (NIC) 846. The hardware 940 includes a CPU 942, a memory 944, and an NIC 946. The hardware 840 and the hardware 940 are simply referred to as the hardware when no distinction need be made.

The CPUs 842 and 942 may have an identical or similar configuration. The CPUs 842 and 942 may be configured by one or more processors. The processor may implement various functions by executing a predetermined program. The processor may acquire a program from the memories 844 and 944 and may acquire a program from the network 300. The program may be stored on a non-transitory computer-readable medium. The CPUs 842 and 942 are simply referred to as the CPU when no distinction need be made.

The memories 844 and 944 may have an identical or similar configuration. The memories 844 and 944 may, for example, be configured as a semiconductor memory or the like, or as a storage medium such as a magnetic disk. The memories 844 and 944 may function as a working memory of the CPUs 842 and 942. The memories 844 and 944 may be included in the CPUs 842 and 942. The memories 844 and 944 are simply referred to as the memory when no distinction need be made.

The NICs 846 and 946 may have an identical or similar configuration. The NICs 846 and 946 may include a communication interface for a local area network (LAN) or the like. The NICs 846 and 946 are simply referred to as the NIC when no distinction need be made.

The primary VM 820 includes a pseudo interrupt generator 822 and a synchronizing information generator 824. With respect to an interrupt actually inputted from an external location to the primary OS 830 or the hypervisor, the pseudo interrupt generator 822 generates a pseudo interrupt with adjusted interrupt frequency or timing and inputs the pseudo interrupt to the application 810. The synchronizing information generator 824 generates synchronizing information for transmitting the execution status of the application 810 on the primary VM 820 to the secondary VM 920 and transmits the synchronizing information to the secondary VM 920.

The secondary VM 920 includes a pseudo interrupt input converter 922 and a synchronization corrector 924. The pseudo interrupt input converter 922 inputs a pseudo interrupt to the application 910 in accordance with the timing of the synchronizing information acquired from the synchronizing information generator 824 of the primary VM 820. The synchronization corrector 924 receives the synchronizing information from the primary VM 820 and executes the application 910 in synchronization with the execution status of the application 810 on the primary VM 820.

When an interrupt for the primary VM 820 is generated from an external location in the fault tolerant system 9 according to the comparative example, synchronizing information that includes the timing at which the interrupt occurs and data thereof is transmitted to the secondary VM 920. The secondary VM 920 operates with a slight delay relative to the primary VM 820 and inputs data or an interrupt in a pseudo-manner at the same timing as the received synchronizing information. The primary VM 820 and the secondary VM 920 can thereby execute the same operations in synchronization.

Here, the following processing is necessary to synchronize an external interrupt between the primary VM 820 and the secondary VM 920. First, the timing at which an interrupt is inputted is measured on the primary VM 820. Specifically, the function of the CPU is used to measure the timing as an execution instruction count from startup of the computer or the like. Next, to input an interrupt at any timing, the secondary VM 920 suspends processing of the virtual machine at the designated execution instruction count, inputs a pseudo interrupt, and resumes operations of the virtual machine. The synchronous processing for an external interrupt according to the above processing places an excessive processing load on the CPU and is dependent on the processing capability of the CPU. For example, in some cases the processing cannot be interrupted at the designated timing. A function for adjusting the timing to interrupt the processing of the primary VM 820 is therefore necessary. The timing adjustment is a complicated process dependent on the functions of the CPU. To perform the timing adjustment on an embedded processor, an adjustment method matching the target processor needs to be implemented.

The use of a high-level programming language, such as Java® (Java is a registered trademark in Japan, other countries, or both), for an intermediate language program enables efficient operation with multiple threads, but processing needs to be synchronized between threads. The program size in the intermediate language execution environment also grows large, since the execution environment is sophisticated. An embedded device has limited memory size and therefore needs a simple, light-weight execution environment. The intermediate language execution environment is generally referred to as a "virtual machine". The intermediate language execution environment for Java®, for example, is referred to as the JavaVM. Although the "JavaVM" includes the term "VM", this differs from the "VM" of the primary VM 820 and the secondary VM 920. Therefore, the "JavaVM" is expressed as an "intermediate language execution environment".

As disclosed in JP 2003-36101 A, operations could be synchronized at the timing of input/output of data to and from an external location. In a method for synchronization at the timing of input/output, however, the application targeted for the redundancy function implemented by the fault tolerant system 9 is limited to the PLC control programming language in the IEC61131-3 standard, for example. Controllers also need to be combined on a dedicated system bus for data equalization.

As described above, the hardware load for implementing a redundancy function on the fault tolerant system 9 according to the comparative example becomes excessive. Demand also exists for implementing a redundancy function on a general-purpose computer using a general-purpose programming language.

A fault tolerant system 1 (see FIG. 2) that can operate with a low load is therefore described in the present disclosure.

EMBODIMENTS

Figure 2:
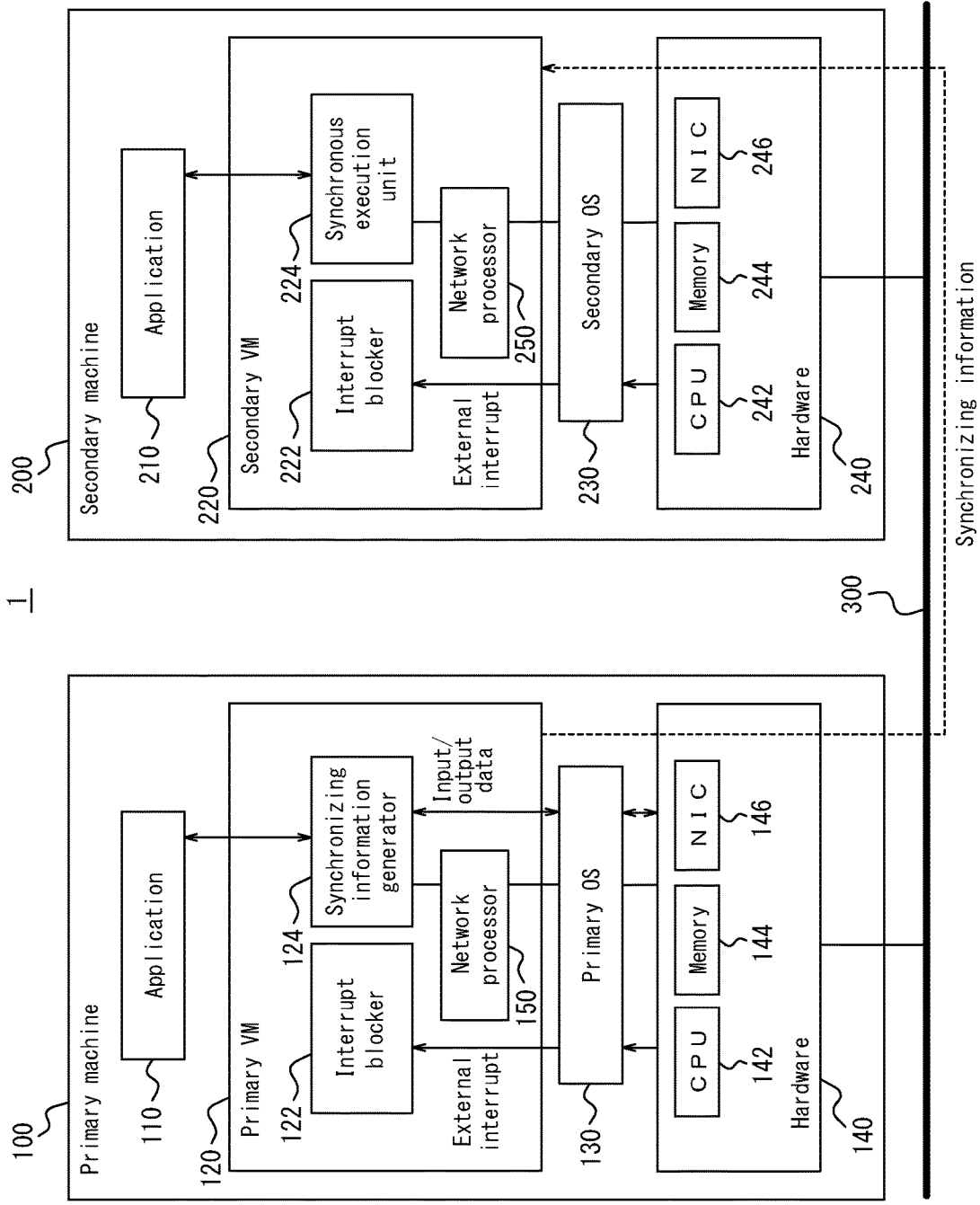
FIG. 2 is a block diagram illustrating an example configuration of a fault tolerant system according to an embodiment.

As illustrated in FIG. 2, the fault tolerant system 1 according to an embodiment of the present disclosure includes a primary machine 100 and a secondary machine 200. The primary machine 100 and the secondary machine 200 are communicably connected via a network 300. The primary machine 100 and the secondary machine 200 both execute the same processing. When a fault occurs in the primary machine 100, the secondary machine 200 inherits the processing. In this way, the processing continues in the fault tolerant system 1 overall.

The primary machine 100 includes hardware 140. A primary OS 130 runs on the hardware 140. The primary machine 100 runs a primary virtual machine 120 on the primary OS 130. The primary virtual machine 120 is referred to below as the primary VM 120. The primary VM 120 includes an interrupt blocker 122 and a synchronizing information generator 124. The primary machine 100 runs an application 110 on the primary VM 120.

The secondary machine 200 includes hardware 240. A secondary OS 230 runs on the hardware 240. The secondary machine 200 runs a secondary virtual machine 220 on the secondary OS 230. The secondary virtual machine 220 is referred to below as the secondary VM 220. The secondary VM 220 includes an interrupt blocker 222 and a synchronous execution unit 224. The secondary machine 200 runs an application 210 on the secondary VM 220.

The primary machine 100 and the secondary machine 200 run the application 110 and the application 210 so that the processing of the application 110 and the processing of the application 210 are the same processing. With this configuration, the secondary machine 200 can inherit the processing when a fault occurs in the primary machine 100. The applications 110 and 210 are simply referred to as the application when no distinction need be made.

Example Configuration

The hardware 140 includes a CPU 142, a memory 144, and an NIC 146. The hardware 240 includes a CPU 242, a memory 244, and an NIC 246. The hardware 140 and the hardware 240 are simply referred to as the hardware when no distinction need be made.

The CPUs 142 and 242 may have an identical or similar configuration. The CPUs 142 and 242 may be configured by one or more processors. The processor may implement various functions by executing a predetermined program. The processor may acquire a program from the memories 144 and 244 and may acquire a program from the network 300. The CPUs 142 and 242 are simply referred to as the CPU when no distinction need be made.

The memories 144 and 244 may have an identical or similar configuration. The memories 144 and 244 may, for example, be configured as a semiconductor memory or the like, or as a storage medium such as a magnetic disk. The memories 144 and 244 may function as a working memory of the CPUs 142 and 242. The memories 144 and 244 may be included in the CPUs 142 and 242. The memories 144 and 244 are simply referred to as the memory when no distinction need be made.

The NICs 146 and 246 may have an identical or similar configuration. The NICs 146 and 246 may include a communication interface for a local area network (LAN) or the like. The NICs 146 and 246 are simply referred to as the NIC when no distinction need be made.

The primary VM 120 includes the interrupt blocker 122 and the synchronizing information generator 124. The interrupt blocker 122 blocks an interrupt, inputted to the primary OS 130 from an external location, from the execution processing of the application 110. The interrupt blocker 122 of the primary VM 120 is also referred to as a first interrupt blocker. The synchronizing information generator 124 generates synchronizing information for transmitting the execution status of the application 110 on the primary VM 120 to the secondary VM 220 and transmits the synchronizing information to the secondary VM 220.

The secondary VM 220 includes the interrupt blocker 222 and the synchronous execution unit 224. The interrupt blocker 222 blocks an interrupt, inputted to the secondary OS 230 from an external location, from the execution processing of the application 210. The interrupt blocker 222 of the secondary VM 220 is also referred to as a second interrupt blocker. The synchronous execution unit 224 receives the synchronizing information from the primary VM 120 and executes the application 210 in synchronization with the execution status of the application 110 on the primary VM 120.

Figure 3:
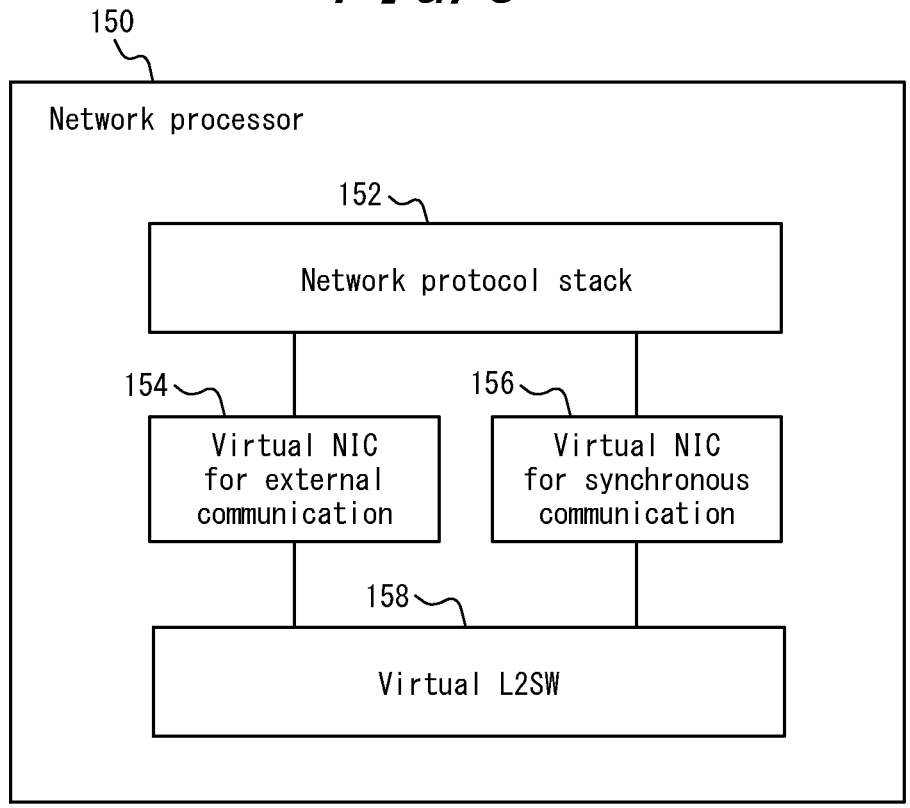
FIG. 3 is a block diagram illustrating an example configuration of a network processor.

The primary VM 120 may optionally include a network processor 150, and the secondary VM 220 may optionally include a network processor 250. The network processors 150 and 250 receive data from the network 300 and transmit data to the network 300. As illustrated in FIG. 3, the network processor 150 includes a network protocol stack 152, a virtual NIC 154 for external communication, a virtual NIC 156 for synchronous communication, and a virtual L2SW (layer 2 switch) 158. The components included in the network processor 150 are described below. The configuration of the network processor 250 is identical or similar to that of the network processor 150.

(Application Operations)

The primary VM 120 runs on the primary OS 130. The secondary VM 220 runs on the secondary OS 230. The primary VM 120 and the secondary VM 220 are collectively referred to as the VM. The primary OS 130 and the secondary OS 230 are collectively referred to as the OS. In other words, the VM runs on the OS. The functions of the OS and the VM are implemented by hardware that includes the CPU.

The primary OS 130 executes processing of the application 110 on the primary VM 120. The secondary OS 230 executes processing of the application 210 on the secondary VM 220. In other words, the OS executes processing of the applications 110 and 210 on the VM.

The VM may be implemented as a general-purpose programming language processing system. A general-purpose programming language processing system may, for example, include mruby or Micro Python. Mruby is a light-weight Ruby language processing system for embedded systems and can operate in a reduced memory environment. A Ruby processing system is mainly implemented as an interpreter. The source code is compiled into bytecode at the time of program execution or before program execution. The interpreter executes the bytecode one instruction at a time.

The primary VM 120 and the secondary VM 220 store each bytecode at the same instruction address. The primary VM 120 and the secondary VM 220 acquire bytecode from the same instruction address and execute operations corresponding to the bytecode. Executing operations corresponding to the bytecode is also referred to as executing the bytecode. The primary VM 120 may cause the synchronizing information generator 124 to execute the bytecode. The secondary VM 220 may cause the synchronous execution unit 224 to execute the bytecode. The primary VM 120 and the secondary VM 220 are synchronized each time an operation corresponding to one bytecode is executed. After synchronization by execution of an operation corresponding to one bytecode, the primary VM 120 and the secondary VM 220 execute an operation corresponding to the next bytecode. In this way, the primary VM 120 and the secondary VM 220 can proceed with processing while synchronizing with each other.

When the bytecode corresponds to an operation to acquire data inputted from an external location or output data to the external location, only the primary VM 120 actually inputs or outputs data to and from the external location. The secondary VM 220, on the other hand, does not actually input or output data to and from the external location.

When the bytecode corresponds to an operation to acquire data inputted from an external location, the secondary VM 220 does not acquire the data inputted from the external location. Rather, the secondary VM 220 acquires, from the primary VM 120, the data inputted from the external location to the primary VM 120. When the bytecode corresponds to an operation to output data to an external location, the secondary VM 220 skips execution of the bytecode.

The primary VM 120 transmits synchronizing information to the secondary VM 220 each time one bytecode is executed. The synchronizing information may include an instruction address where the bytecode is stored or data inputted from an external location to the primary VM 120. The synchronizing information may include information representing the execution instruction count. The synchronizing information may include information specifying the bytecode executed by the primary VM 120.

The secondary VM 220 receives the synchronizing information from the primary VM 120 and proceeds with bytecode processing based on the synchronizing information. The secondary VM 220 proceeds with processing of the bytecode that matches the instruction address or the execution instruction count received from the primary VM 120. After completing the processing of one bytecode, the secondary VM 220 suspends processing until receiving the next synchronizing information from the primary VM 120.

The primary VM 120 and the secondary VM 220 can proceed with bytecode processing in synchronization by transmitting and receiving the above-described synchronizing information.

To reduce memory use by the VM, mruby simplifies processing to reduce the program size of the VM. One of the functions for simplifying processing is conversion to single threaded program processing. Single threading refers to not executing a plurality of instructions simultaneously in parallel and not suspending processing due to an interrupt from an external location. As a result of processing not being suspended by an interrupt from an external location, a complicated timing adjustment function becomes unnecessary. The processing is thereby simplified.

Even if an interrupt from an external location does not occur on the VM level, an interrupt from an external location may occur on the OS level. Accordingly, an interrupt from an external location may occur while bytecode is being executed on the VM. The execution result of bytecode does not change, however, due to the interrupt from an external location.

As a result of the bytecode being executed on the primary VM 120, the synchronizing information generator 124 of the primary VM 120 acquires the instruction address or the execution instruction count of the executed bytecode. When the primary VM 120 acquires data inputted from an external location, the synchronizing information generator 124 acquires the data. The synchronizing information generator 124 generates synchronizing information that includes the acquired instruction address or executed instruction count, or the data inputted from the external location, and transmits the synchronizing information to the secondary VM 220. The instruction to acquire the data inputted from the external location is also referred to as an input instruction. The synchronizing information generator 124 outputs the data, inputted from an external location by execution of the input command as bytecode, as synchronizing information.

After transmitting the synchronizing information to the secondary VM 220, the synchronizing information generator 124 does not cause the primary VM 120 to execute the next bytecode until receiving an acknowledgment from the secondary VM 220. In other words, when an acknowledgment is received from the secondary VM 220, the synchronizing information generator 124 permits execution of the next bytecode by the primary VM 120.

The synchronous execution unit 224 of the secondary VM 220 receives the synchronizing information from the synchronizing information generator 124 of the primary VM 120. The synchronous execution unit 224 controls execution of the bytecode on the secondary VM 220 based on the received synchronizing information. For example, the synchronous execution unit 224 may cause the secondary VM 220 to execute the bytecode stored at the instruction address included in the synchronizing information. The synchronous execution unit 224 may cause the secondary VM 220 to execute the bytecode matching the execution instruction count included in the synchronizing information.

When the bytecode to be executed next by the secondary VM 220 corresponds to an operation to acquire data inputted from an external location, the synchronous execution unit 224 causes the secondary VM 220 to skip execution of the bytecode. The synchronizing information in this case includes the data inputted from the external location. The secondary VM 220 considers the data inputted from the external location and included in the synchronizing information to be the data obtained as the result of executing the skipped bytecode and proceeds to processing of the next bytecode. As a result of the synchronizing information including the data inputted from the external location, the secondary machine 200 need not communicate with the external location. In this way, the load of the fault tolerant system 1 overall is reduced. Consequently, the fault tolerant system 1 can operate with a low load.

The interrupt blocker 122 of the primary VM 120 and the interrupt blocker 222 of the secondary VM 220 block interrupts inputted to the OS from an external location. The interrupts inputted to the OS from an external location are also referred to as external interrupts. The external interrupts may be interrupts from a location that is external from the perspective of the CPU that implements the functions of the OS and the VM. The interrupts from a location that is external from the perspective of the CPU may include interrupts from the memory or the NIC or interrupts from a location external to the hardware. The interrupt blockers 122 and 222 block external interrupts so that the external interrupts do not affect the VM when the VM is in the middle of executing bytecode.

The primary VM 120 judges whether a blocked external interrupt is related to execution of bytecode. When the blocked external interrupt is not related to execution of the bytecode, the interrupt blocker 122 may discard the external interrupt. When the blocked external interrupt is related to execution of the bytecode, the interrupt blocker 122 may transmit the external interrupt to the primary VM 120. In other words, when the bytecode is an instruction to accept an interrupt and to be executed based on the interrupt, the interrupt blocker 122 transmits the interrupt inputted during execution of the instruction to the primary VM 120 (synchronizing information generator 124). The primary VM 120 may execute the bytecode based on the external interrupt. The secondary VM 220 does not execute bytecode to accept an external interrupt and be executed based on the external interrupt. Accordingly, the interrupt blocker 222 of the secondary VM 220 may discard all external interrupts.

Example of Program

A program for acquiring a string from an external location, concatenating a different string to the acquired string, and outputting the concatenated string to an external location is described as an example of an mruby program. The two strings are represented as X and Y. This program can be compiled into the following four bytecodes. The codes A, B, C, and D each correspond to one instruction.

Code A: The VM assigns the string constant "X" to a first register.
Code B: the VM acquires a string as data inputted from an external location and assigns the string to a second register. In the present program example, the string "Y" is acquired.
Code C: the VM concatenates the string of the first register and the string of the second register and assigns the concatenated string to the first register.
Code D: the VM outputs the string of the first register to an external location.

A configuration for the primary machine 100 and the secondary machine 200 to execute the above-described bytecode in synchronization is described with reference to FIGS. 4 and 5.

Figure 4:
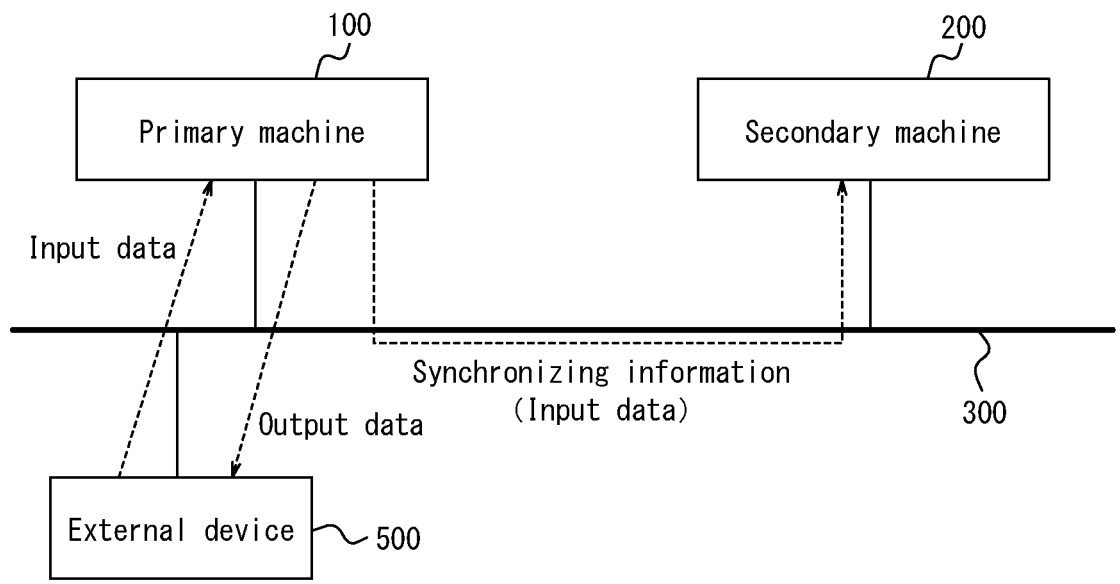
FIG. 4 is a block diagram illustrating an example configuration for executing bytecode.

As illustrated in FIG. 4, the primary machine 100 and the secondary machine 200 are communicably connected to an external device 500 via to the network 300. The primary machine 100 acquires input data from the external device 500. The primary machine 100 outputs output data to the external device 500. The primary machine 100 transmits synchronizing information to the secondary machine 200. When the input data is acquired from the external device 500, the primary machine 100 outputs synchronizing information including the input data to the secondary machine 200.

If a fault occurs on the primary machine 100, the secondary machine 200 can continue to execute the bytecode. Although the secondary machine 200 does not communicate with the external device 500 while the primary machine 100 is operating, the secondary machine 200 can input/output data to and from the external device 500 when the primary machine 100 stops due to a fault.

Figure 5:
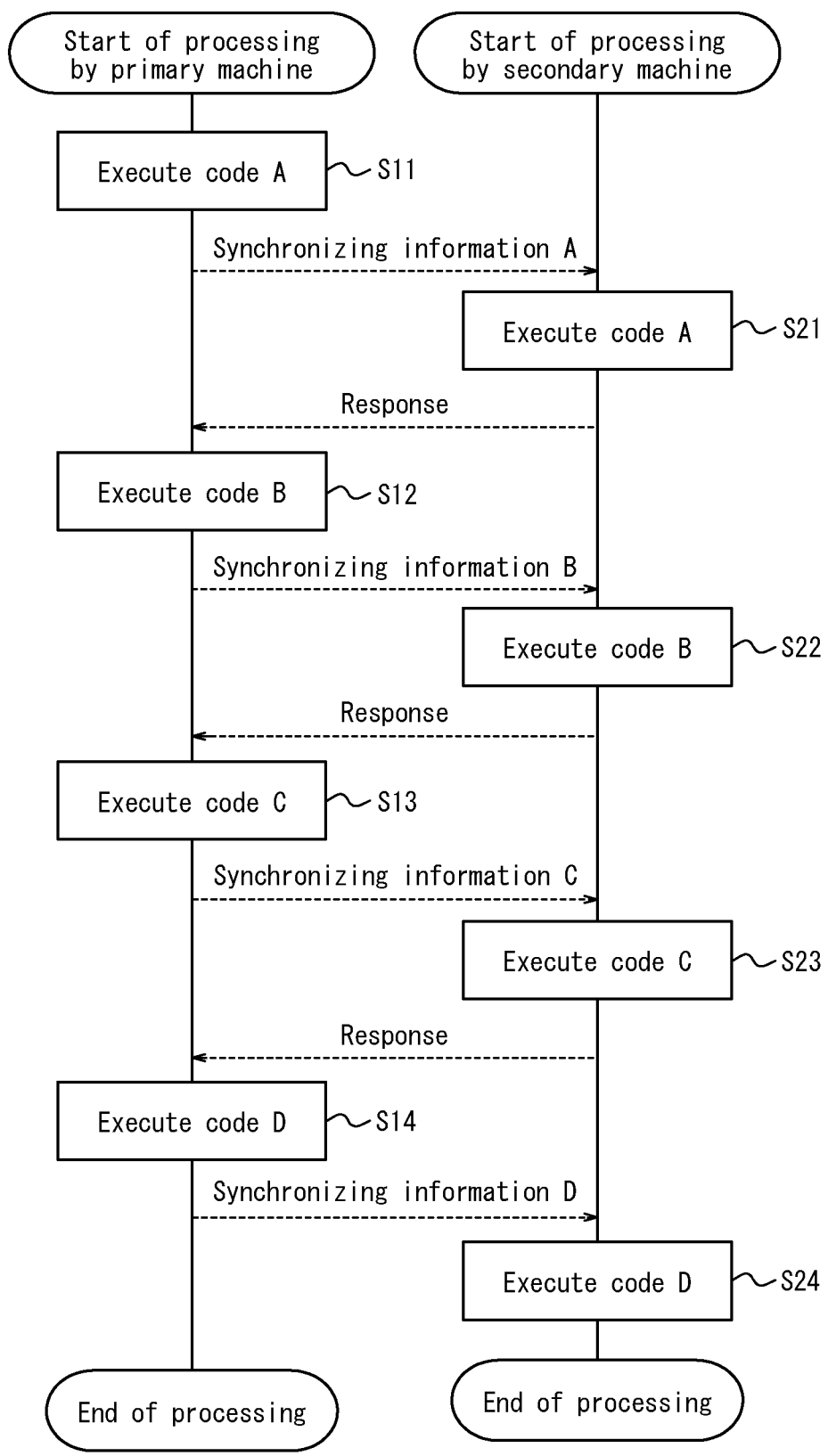
FIG. 5 is a flowchart illustrating an example of procedures for executing bytecode.

The primary VM 120 and the secondary VM 220 execute the above-described bytecode by the procedures illustrated in FIG. 5.

The primary VM 120 executes the code A (step S11). As operations corresponding to the code A, the primary VM 120 assigns the string constant "X" to the first register. After executing the code A by the procedure of step S11, the primary VM 120 transmits synchronizing information A to the secondary VM 220. The string constant "X" is included in the code A and therefore is not included in the synchronizing information A.

When the synchronizing information A is received from the primary VM 120, the secondary VM 220 executes the code A based on the synchronizing information A (step S21). As operations corresponding to the code A, the secondary VM 220 assigns the string constant "X" to the first register. After executing the code A by the procedure of step S21, the secondary VM 220 transmits a response indicating completion of execution of the code A to the primary VM 120.

When the response is received from the secondary VM 220, the primary VM 120 executes the code B, which is the next bytecode (step S12). As operations corresponding to the code B, the primary VM 120 acquires the string "Y" as input data from the external device 500 and assigns the string "Y" to the second register. After executing the code B by the procedure of step S12, the primary VM 120 transmits synchronizing information B, including the string "Y" that is the input data from the external device 500, to the secondary VM 220.

When the synchronizing information B is received from the primary VM 120, the secondary VM 220 executes the code B based on the synchronizing information B (step S22). As operations corresponding to the code B, the secondary VM 220 assigns the string "Y" included in the synchronizing information B to the second register, instead of acquiring the input data from the external device 500. After executing the code B by the procedure of step S22, the secondary VM 220 transmits a response indicating completion of execution of the code B to the primary VM 120.

When the response is received from the secondary VM 220, the primary VM 120 executes the code C, which is the next bytecode (step S13). As operations corresponding to the code C, the primary VM 120 concatenates the string of the first register and the string of the second register and assigns the concatenated string to the first register. In this case, the string assigned to the first register becomes "XY". After executing the code C by the procedure of step S13, the primary VM 120 transmits synchronizing information C to the secondary VM 220.

When the synchronizing information C is received from the primary VM 120, the secondary VM 220 executes the code C based on the synchronizing information C (step S23). As operations corresponding to the code C, the secondary VM 220 concatenates the string of the first register and the string of the second register and assigns the concatenated string to the first register. In this case, the string assigned to the first register on the secondary VM 220 as well becomes "XY". After executing the code C by the procedure of step S23, the secondary VM 220 transmits a response indicating completion of execution of the code C to the primary VM 120.

When the response is received from the secondary VM 220, the primary VM 120 executes the code D, which is the next bytecode (step S14). As operations corresponding to the code D, the primary VM 120 outputs the string of the first register to the external device 500. In this case, the string acquired by the external device 500 is "XY". After executing the code D by the procedure of step S14, the primary VM 120 transmits synchronizing information D to the secondary VM 220.

When the synchronizing information D is received from the primary VM 120, the secondary VM 220 executes the code D based on the synchronizing information D (step S24). As operations corresponding to the code D, the secondary VM 220 does not output the character string of the first register to the external device 500, but rather does nothing. In other words, the secondary VM 220 skips operations corresponding to the code D. After executing the code D in the procedure of step S24 by skipping the corresponding operations, the secondary VM 220 transmits a response indicating completion of execution of the code D to the primary VM 120.

After transmitting a response indicating completion of execution of the code D to the primary VM 120, the secondary VM 220 completes execution of the sequence of bytecode. The primary VM 120 completes execution of the sequence of bytecode by receiving the response from the secondary VM 220.

As described with reference to FIGS. 4 and 5, the primary VM 120 and the secondary VM 220 can execute the bytecode in synchronization. If the primary VM 120 stops due to a fault during execution of the sequence of bytecode, the secondary VM 220 can continue executing the bytecode. The secondary machine 200 can communicably connect to the external device 500 over the network 300 to continue executing bytecode corresponding to operations to input/output data.

Redundancy of processing is achieved in the fault tolerant system 1 when both the primary machine 100 and the secondary machine 200 are operating normally. Here, operations of the fault tolerant system 1 when the primary machine 100 or the secondary machine 200 stops due to a fault are described.

<Fault Occurring in Primary Machine 100>

When a fault occurs in the primary machine 100, the primary VM 120 may no longer be able to properly execute control processing, such as execution of bytecode. The fault tolerant system 1 switches the control processing, such as execution of bytecode, from the primary VM 120 of the primary machine 100 to the secondary VM 220 of the secondary machine 200. The fault tolerant system 1 enters a state of single operation, in which only the secondary machine 200 operates. In the state of single operation, the secondary VM 220 that substitutes for operations of the primary VM 120 stops the synchronous processing with the primary VM 120.

When the primary VM 120 is able to detect a fault in the primary machine 100, the primary VM 120 stops or restarts the primary machine 100 while attempting to transmit a fault notification to the secondary VM 220. The fault notification may be transmitted over the same transmission channel as the synchronizing information. When the primary VM 120 is able to transmit the fault notification to the secondary VM 220, the secondary VM 220 learns of the occurrence of the fault in the primary machine 100 by receiving the fault notification from the primary VM 120. When the primary VM 120 is unable to transmit the fault notification to the secondary VM 220, the secondary VM 220 may learn of the occurrence of the fault in the primary machine 100 by means for monitoring the primary machine 100. When learning that a fault has occurred in the primary machine 100, the secondary VM 220 inherits the control processing, such as execution of bytecode, from the primary VM 120 and stops synchronous processing with the primary machine 100. The secondary VM 220 also executes processing so that the secondary VM 220, instead of the primary VM 120, inputs and outputs data to and from an external location via the secondary OS 230.

When the primary VM 120 is unable to detect a fault in the primary machine 100, the primary machine 100 simply stops. The secondary VM 220 may learn of the occurrence of the fault in the primary machine 100 by means for monitoring the primary machine 100. When learning that a fault has occurred in the primary machine 100, the secondary VM 220 inherits the control processing, such as execution of bytecode, from the primary VM 120 and stops synchronous processing with the primary machine 100.

<Fault Occurring in Secondary Machine 200>

When a fault occurs in the secondary machine 200, the fault tolerant system 1 enters a state of single operation, in which only the primary machine 100 operates. During the state of single operation, the primary VM 120 stops synchronous processing with the secondary VM 220.

When the secondary VM 220 is able to detect a fault in the secondary machine 200, the secondary VM 220 stops or restarts the secondary machine 200 while attempting to transmit a fault notification to the primary VM 120. The fault notification may be transmitted over the same transmission channel as the synchronizing information. When the secondary VM 220 is able to transmit the fault notification to the primary VM 120, the primary VM 120 learns of the occurrence of the fault in the secondary machine 200 by receiving the fault notification from the secondary VM 220. When the secondary VM 220 is unable to transmit the fault notification to the primary VM 120, the primary VM 120 may learn of the occurrence of the fault in the secondary machine 200 by means for monitoring the secondary machine 200. When learning that a fault has occurred in the secondary machine 200, the primary VM 120 stops synchronous processing with the secondary machine 200 during the control processing, such as execution of bytecode. The primary VM 120 may stop synchronous processing by stopping operations of the synchronizing information generator 124.

When the secondary VM 220 is unable to detect a fault in the secondary machine 200, the secondary machine 200 simply stops. The primary VM 120 may learn of the occurrence of the fault in the secondary machine 200 by means for monitoring the secondary machine 200. When learning that a fault has occurred in the secondary machine 200, the primary VM 120 stops synchronous processing with the secondary machine 200 during the control processing, such as execution of bytecode.

The means for the primary VM 120 to monitor the secondary machine 200 or the means for the secondary VM 220 to monitor the primary machine 100 can, for example, be implemented as follows.

For example, the primary VM 120 and the secondary VM 220 may periodically communicate with each other to monitor for activity, such as a heartbeat. When there is no response from the secondary VM 220, the primary VM 120 may judge that a fault has occurred in the secondary machine 200. When there is no response from the primary VM 120, the secondary VM 220 may judge that a fault has occurred in the primary machine 100. By receiving synchronizing information from the primary VM 120 during synchronous processing, the secondary VM 220 may judge that a fault has not occurred in the primary machine 100. By receiving a response from the secondary VM 220 during synchronous processing, the primary VM 120 may judge that a fault has not occurred in the secondary machine 200.

For example, a third machine that differs from the primary machine 100 and the secondary machine 200 may monitor operations of the primary machine 100 and the secondary machine 200. The third machine may notify the secondary VM 220 of a fault occurring on the primary machine 100 and may notify the primary VM 120 of a fault occurring on the secondary machine 200. The third machine may periodically communicate with the primary VM 120 and the secondary VM 220 to monitor for activity, such as a heartbeat.

The primary VM 120 and the secondary VM 220 might mistakenly judge that a fault has occurred in the primary machine 100 and the secondary machine 200 if the communication to monitor for activity is lost due to network failure. To avoid mistaken detection, due to network failure, of a fault in the primary machine 100 and the secondary machine 200, the communication channel for monitoring activity may be multiplexed.

An example of operations of the fault tolerant system 1 when a fault occurs in the primary machine 100 is now described. By executing the procedures of the flowchart in FIG. 6, for example, the secondary VM 220 may continue to execute bytecode when the primary VM 120 stops due to a fault.

It is assumed that a fault has occurred in the primary machine 100 (step S31). The primary VM 120 judges whether a fault in the primary machine 100 has been detected (step S32).

When a fault in the primary machine 100 has not been detected (step S32: NO), the primary VM 120 proceeds to the procedure of step S35. When a fault in the primary machine 100 has been detected (step S32: YES), the primary VM 120 judges whether the secondary VM 220 can be notified of the occurrence of the fault in the primary machine 100 (step S33). In other words, the primary VM 120 judges whether a fault notification can be transmitted to the secondary VM 220.

When a fault notification cannot be transmitted to the secondary VM 220 (step S33: NO), the primary VM 120 proceeds to the procedure of step S35. When a fault notification can be transmitted to the secondary VM 220 (step S33: YES), the primary VM 120 transmits the fault notification to the secondary VM 220 (step S34).

The primary VM 120 stops or restarts the primary machine 100 (step S35). When the primary VM 120 is unable to detect a fault in the primary machine 100, the primary machine 100 simply stops. After the primary VM 120 judges that a fault notification cannot be transmitted, or after transmitting the fault notification, the primary VM 120 may stop or restart the primary machine 100. The stopping or restarting of the primary machine 100 prevents both the primary machine 100 and the secondary machine 200 from operating as the primary machine 100. After executing the procedure of step S35, the primary VM 120 ends the procedures of the flowchart in FIG. 6.

The secondary VM 220 judges whether a fault notification has been received from the primary VM 120 (step S41).

When a fault notification has been received from the primary VM 120 (step S41: YES), the secondary VM 220 proceeds to the procedure of step S45. When a fault notification has not been received from the primary VM 120 (step S41: NO), the secondary VM 220 judges whether a response has been received from the primary VM 120 (step S42). When a response has not been received from the primary VM 120 (step S42. NO), the secondary VM 220 proceeds to the procedure of step S45. When a response has been received from the primary VM 120 (step S42: YES), the secondary VM 220 judges that the primary machine 100 is operating properly (step S43). When the primary machine 100 is operating properly, the secondary VM 220 continues operating as the secondary VM 220 (step S44). After executing the procedure of step S44, the secondary VM 220 ends the procedures of the flowchart in FIG. 6.

When a fault notification is received from the primary VM 120 in the procedure of step S41, or when no response is received from the primary VM 120 in the procedure of step S42, the secondary VM 220 judges that a fault has occurred in the primary machine 100 (step S45). When a fault has occurred in the primary machine 100, the secondary VM 220 substitutes for operations of the primary VM 120 and continues processing of the bytecode (step S46). Specifically, the synchronous execution unit 224 of the secondary VM 220 stops waiting for receipt of synchronizing information from the primary VM 120, thereby stopping the synchronous processing with the primary VM 120. Instead of the primary VM 120, the secondary VM 220 executes the bytecode that the primary VM 120 was planning to execute next. For example, when the primary VM 120 was planning to execute bytecode for accepting data input from an external location, the secondary VM 220 accepts data input from the external location instead of the primary VM 120. The interrupt blocker 222 of the secondary VM 220 executes the same processing as the interrupt blocker 122 of the primary VM 120. After executing the procedure of step S46, the secondary VM 220 ends the procedures of the flowchart in FIG. 6.

Figure 6:
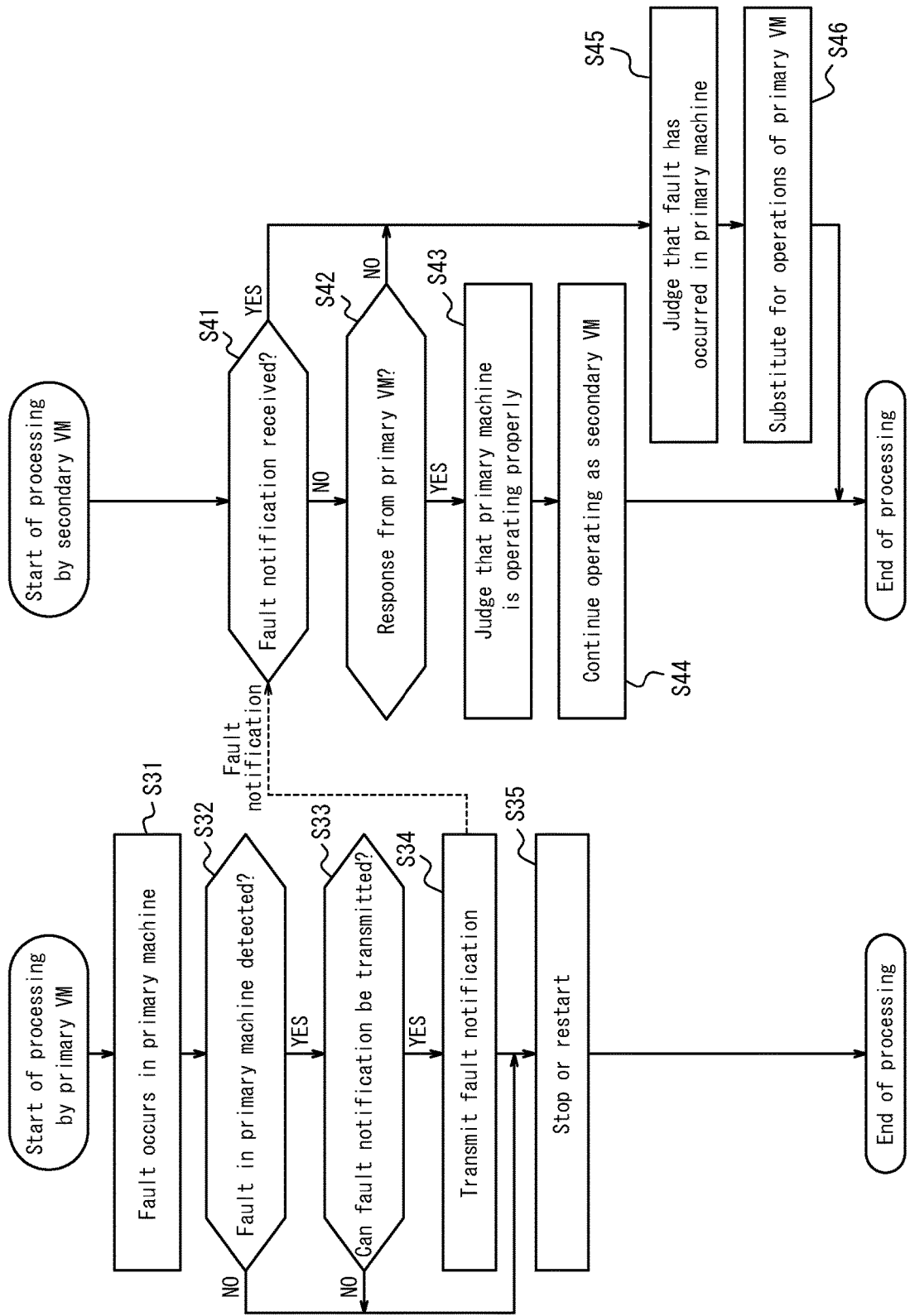
FIG. 6 is a flowchart illustrating an example of procedures for a secondary VM to continue executing bytecode.

By execution of the procedures of the flowchart in FIG. 6 in the fault tolerant system 1, control processing such as execution of bytecode can be continued on the secondary machine 200 even if a fault occurs in the primary machine 100. When the fault in the primary machine 100 is resolved while the secondary machine 200 is continuing the control processing after the procedures in FIG. 6, the fault tolerant system 1 can return from the state of single operation to the state of redundant processing. Specifically, the secondary VM 220 returns to the state before the fault occurred in the primary machine 100. As synchronizing information, the primary VM 120 receives information processed by the secondary VM 220 while the fault was occurring on the primary machine 100 and inherits operations as the primary VM 120 from the secondary VM 220. The primary VM 120 and the secondary VM 220 may also exchange functions and operate.

As described above, the fault tolerant system 1 according to the present embodiment can execute bytecode while synchronizing operations between the primary machine 100 and the secondary machine 200 without performing complicated timing adjustments. This reduces the processing load for achieving redundancy of the primary machine 100 and the secondary machine 200. That is, the amount of processing for redundancy or the program size is reduced. The fault tolerant system 1 can consequently operate with a low load. In other words, the fault tolerant system 1 can achieve redundancy even when using a processor with low processing performance as the primary machine 100 and the secondary machine 200.

Example of Interrupt Processing

Bytecode is classified into instructions that accept an external interrupt during execution and instructions that do not accept an external interrupt during execution. An instruction that accepts an external interrupt during execution corresponds to an instruction for which an external interrupt corresponding to execution of processing occurs. This instruction is also referred to as an interrupt instruction or a first instruction. An instruction that does not accept an external interrupt during execution corresponds to an instruction for which an external interrupt corresponding to execution of processing does not occur. This instruction is also referred to as a non-interrupt instruction or a second instruction. The above-described information specifying bytecode may specify whether the bytecode corresponds to an interrupt instruction or a non-interrupt instruction.

Interrupt instructions may, for example, include a network transmission/reception instruction, a storage read/write instruction, an instruction related to a timer process, or the like. In the case of processing an interrupt instruction, the CPU that implements the functions of the VM may require some time from start to completion of processing. An NIC or memory other than the CPU is used for processing of the interrupt instruction in some cases, and the CPU may therefore not be aware of processing completion. In this case, the CPU can learn that processing of the interrupt instruction is complete by an interrupt from the memory or the NIC. The CPU can thereby end execution of an interrupt instruction by receiving an external interrupt.

Non-interrupt instructions include processing to assign a value to a register, processing for the four arithmetic operations, and the like. The CPU can end execution of a non-interrupt instruction regardless of an external interrupt.

A specific example of an interrupt operation is described below.

<Instruction Related to Network Transmission/Reception Process>

When receipt of data from the network 300 is complete, or when transmission of data to the network 300 is complete, the NIC issues an external interrupt. Upon acceptance of the external interrupt, the OS suspends other processing and reads the data received by the NIC from the NIC or writes the data to be transmitted by the NIC to the NIC.

The OS and the VM implemented by the CPU execute instructions related to network transmission/reception with the operations illustrated below as the procedures from step S51 to step S56.

S51: the VM starts to execute bytecode corresponding to an instruction related to network transmission/reception.
S52: the VM executes an instruction related to network transmission/reception by the OS (system call) and waits until completion.
S53: the OS transmits or receives data to or from the NIC and receives an external interrupt from the NIC. The external interrupt is generated when the NIC has received the data from an external location or when the NIC has transmitted data to an external location.
S54: the OS transmits and receives data to and from the VM and notifies the VM of the external interrupt.
S55: through the external interrupt, the VM learns that processing of the network transmission/reception instruction is complete and returns from the system call. When receiving an external interrupt, the primary VM 120 outputs the external interrupt to the synchronizing information generator 124, generates synchronizing information including information related to the external interrupt with the synchronizing information generator 124, and transmits the synchronizing information to the secondary VM 220.

S56: the VM executes necessary processing on the transmitted or received data and ends execution of the bytecode corresponding to the instruction related to network transmission/reception.

By execution of the above-described procedures from step S51 to step S56, an external interrupt, generated while the VM is executing bytecode corresponding to the network transmission/reception instruction, is processed within the VM, and the application is not notified. As a result of the external interrupt issued by the NIC being processed within the VM, the fault tolerant system 1 can accept necessary interrupts rather than unconditionally blocking interrupts. The usefulness of the fault tolerant system 1 consequently increases.

<Instruction Related to Timer Process>

The hardware may further include a timer. The timer issues an external interrupt corresponding to a set time. The timer may be set to issue an external interrupt at regular intervals. The timer may issue an external interrupt corresponding to an individually set time.

The OS and the VM implemented by the CPU execute instructions related to a timer process with operations illustrated below as the procedures from step S61 to step S67.

S61: the VM starts to execute bytecode corresponding to an instruction related to a timer process.
S62: the VM executes a timer command (system call) of the OS and waits until completion.
S63: the OS sets the wait time (interval) in the timer.
S64: the OS receives an external interrupt issued by the timer after the time set in the timer elapses.
S65: the OS notifies the VM of the external interrupt.
S66: through the external interrupt, the VM learns that the timer process is complete and returns from the system call. When receiving an external interrupt, the primary VM 120 outputs the external interrupt to the synchronizing information generator 124, generates synchronizing information including information related to the external interrupt with the synchronizing information generator 124, and transmits the synchronizing information to the secondary VM 220.
S67: the VM executes necessary processing for the timer and ends execution of the bytecode corresponding to an instruction related to the timer process.

By execution of the above-described procedures from step S61 to step S67, an external interrupt, generated while the VM is executing bytecode corresponding to an instruction related to a timer process, is processed within the VM, and the application is not notified. As a result of the external interrupt issued by the timer being processed within the VM, the fault tolerant system 1 can accept necessary interrupts rather than unconditionally blocking interrupts. The usefulness of the fault tolerant system 1 consequently increases.

As in the above description of a configuration for executing a network transmission/reception instruction or an instruction related to the timer process, the fault tolerant system 1 can implement redundancy while accepting necessary interrupts, without performing complicated timing adjustments. This reduces the processing load of the CPU. Consequently, redundancy can be achieved even when a processor with a low processing performance is used as the CPU. Furthermore, the fault tolerant system 1 can process an external interrupt without affecting application processing.

The instruction related to a network process in the example accepts an interrupt issued by the NIC but does not accept other interrupts. The instruction related to a timer process accepts an interrupt issued by the timer but does not accept other interrupts. In other words, various interrupts are classified into an interrupt accepted by an interrupt instruction is accepted and an interrupt not accepted by an interrupt instruction. An interrupt accepted by an interrupt instruction is also referred to as a first interrupt. An interrupt not accepted by an interrupt instruction is also referred to as a second interrupt. The interrupt blocker 122 of the primary VM 120 blocks the second interrupt regardless of whether the primary VM 120 (synchronizing information generator 124) is executing an interrupt instruction (first instruction) or a non-interrupt instruction (second instruction). On the other hand, the interrupt blocker 122 blocks the first interrupt if the primary VM 120 (synchronizing information generator 124) is executing a non-interrupt instruction (second instruction). This configuration can easily block the second interrupt. In other words, the processing load of the interrupt blocker 122 is reduced. The fault tolerant system 1 can consequently operate with a low load. By information identifying the bytecode executed by the primary VM 120 being included in the synchronizing information, the interrupt blocker 122 can easily judge whether to block the interrupt based on the synchronizing information. In other words, the processing load of the interrupt blocker 122 is reduced. The fault tolerant system 1 can consequently operate with a low load.

OTHER EMBODIMENTS

Other embodiments are described below.

<Synchronization Timing>

The primary VM 120 and the secondary VM 220 may transmit and receive synchronizing information when executing bytecode corresponding to operations that involve input/output to and from an external location. In this case, the primary VM 120 and the secondary VM 220 only synchronize processing at the timing of input/output to and from an external location.

Specifically, the primary VM 120 transmits synchronizing information to the secondary VM 220 only at the timing of input from an external location. In other words, the secondary VM 220 waits for synchronizing information from the primary VM 120 only when bytecode corresponding to input from an external location is executed. The secondary VM 220 transmits a response to the primary VM 120 only at the timing of output to an external location. In other words, the primary VM 120 waits for a response from the secondary VM 220 only when bytecode corresponding to output to an external location is executed. The primary VM 120 and the secondary VM 220 may execute bytecode without waiting for each other in the case of executing other bytecode.

When operations are synchronized only in the case of input/output to and from an external location, as described above, the processing delay can be reduced as compared to when synchronizing information and a response are exchanged each time one bytecode is executed.

<Method of Transmitting and Receiving Synchronizing Information>

Synchronizing information may be transmitted and received between the primary VM 120 and the secondary VM 220 by Ethernet® (Ethernet is a registered trademark in Japan, other countries, or both), for example. In this case, an IP address needs to be allocated to each of the primary machine 100 and the secondary machine 200.

One method for allocating IP addresses is to allocate the same IP address to the primary machine 100 and the secondary machine 200, for example. When the primary machine 100 stops due to a fault, and the secondary machine 200 inherits processing, this approach enables the external device 500 to continue communicating data with the same IP address. On the other hand, IP communication is not possible between the primary machine 100 and the secondary machine 200. Communication between the primary machine 100 and the secondary machine 200 therefore does not use Transmission Control Protocol/Internet Protocol (TCP/IP) or User Datagram Protocol/Internet Protocol (UDP/IP) but rather is implemented by Ethernet® frame communication using Media Access Control (MAC) addresses.

Another method for allocating IP addresses is to allocate different IP addresses to the primary machine 100 and the secondary machine 200, for example. With this approach, communication between the primary machine 100 and the secondary machine 200 is implemented by IP communication. On the other hand, when the primary machine 100 stops due to a fault, and the secondary machine 200 inherits processing, the IP addresses needs to be switched from the perspective of the external device 500 for continued communication with the fault tolerant system 1.

In both of the two example methods, the primary machine 100 and the secondary machine 200 have different MAC addresses. The external device 500 therefore needs to change the MAC address to continue communicating with the fault tolerant system 1. In the case of using UDP/IP communication, the UDP/IP communication can continue, since no connection is necessary. On the other hand, reconnection is necessary in the case of using TCP/IP communication, since the TCP/IP connection cannot be inherited.

<Continuation of TCP/IP Communication>

An example method for continuing TCP/IP communication is described below. As illustrated in FIGS. 2 and 3, the primary machine 100 optionally further includes a network processor 150, and the secondary machine 200 optionally further includes a network processor 250. The network processors 150 and 250 are simply referred to as the network processor when no distinction need be made.

The primary machine 100 and the secondary machine 200 illustrated in FIGS. 2 and 3 execute a network protocol process, such as TCP/IP or UDP/IP, using the NIC and the OS. The MAC address of the NIC is fixed for each piece of hardware. Accordingly, the MAC address is not inherited between the primary machine 100 and the secondary machine 200. Furthermore, since the network protocol process is executed within the OS, the information necessary for communication, such as TCP connection information, is not inherited by the redundancy function of the VM (the function to inherit processing on another VM when one VM stops). Accordingly, TCP communication is sometimes outside of the scope of VM redundancy.

The network processor 150 in the primary VM 120 includes a virtual L2SW 158, a virtual NIC 154 for external communication, a virtual NIC 156 for synchronous communication, and a network protocol stack 152. Processes required for inheriting the information necessary for communication can be managed by the VM. The virtual NIC 154 for external communication and the virtual NIC 156 for synchronous communication are also collectively referred to as the virtual NIC.

Specifically, the example operations below are executed.

The VM transfers all of the received data to the virtual NIC by causing the NIC to operate in promiscuous mode. In this case, the NIC is handled in the same way as a general network switch (L2 switch), and the MAC address fixed by hardware has no effect on switching communication.

The virtual L2SW relays communication between the NIC and the virtual NIC.

A MAC address is set by software in the virtual NIC. By the MAC address being set by software, the same MAC address is set for the virtual NIC of the primary VM 120 and the virtual NIC of the secondary VM 220. The virtual NIC includes the virtual NIC 154 for external communication and the virtual NIC 156 for synchronous communication. The virtual NIC 154 for external communication and the virtual NIC 156 for synchronous communication are each allocated an IP address. The virtual NIC 154 for external communication is used for communication with an external location. The virtual NIC 156 for synchronous communication is used for transmission and reception of synchronizing information between the primary VM 120 and the secondary VM 220.

The network protocol stack 152 executes the network protocol processes executed by the OS. Specifically, the network protocol stack 152 executes processes of the network layer (IP) and the transport layer (TCP or UDP) for the communication data received by the virtual NIC. The TCP connection information and the like can thereby be managed on the VM.

In addition to the generated synchronizing information, the synchronizing information generator 124 of the primary VM 120 also collects information of the virtual NIC or the network protocol stack 152 and transmits this information to the secondary VM 220. The TCP connection information is thereby equalized. Consequently, TCP/IP communication can be continued.

As illustrated in FIG. 7, the primary machine 100 includes a first primary VM 120A through an $N^{th}$ primary VM 120N as the primary VM 120. The first primary VM 120A through the $N^{th}$ primary VM 120N execute respective processes of a first application 110A through an $N^{th}$ application 110N. The primary machine 100 includes the network processor 150 separately from the primary VM 120.

The secondary machine 200 includes a first secondary VM 220A through an $N^{th}$ secondary VM 220N as the secondary VM 220. The first secondary VM 220A through the $N^{th}$ secondary VM 220N execute respective processes of a first application 210A through an $N^{th}$ application 210N. The secondary machine 200 includes the network processor 250 separately from the secondary VM 220.

In this configuration, the primary machine 100 and the secondary machine 200 can cause the network processor to operate as a separate process from the VM. This enables the fault tolerant system 1 to execute communication processes collectively even when processing a plurality of applications simultaneously. In this case, the operations of the primary VM 120 and the secondary VM 220 may be the same as the operations according to the above-described embodiments.

Embodiments of the present disclosure have been described with reference to the drawings, but specific configurations are not limited to these embodiments, and a variety of modifications may be made without departing from the spirit and scope thereof.

The invention claimed is:

1. A fault tolerant system comprising:
  a primary virtual machine running on a primary OS and comprising a synchronizing information generator configured to execute bytecode and output synchronizing information based on information related to the bytecode that is executed and a first interrupt blocker configured to block a primary interrupt inputted into the primary OS; and
  a secondary virtual machine running on a secondary OS comprising a synchronous execution unit configured to execute, based on the synchronizing information, the bytecode and a second interrupt blocker configured to block a secondary interrupt inputted into the secondary OS, wherein when the primary interrupt is acquired, the synchronizing information generator is configured to execute, based on the primary interrupt, the bytecode, and the first interrupt blocker is configured to output the primary interrupt to the synchronizing information generator when the primary interrupt is inputted during execution of an instruction, included in the bytecode, to accept the primary interrupt.

2. The fault tolerant system of claim 1, wherein the bytecode includes a first instruction to accept the primary interrupt during execution and a second instruction not to accept the primary interrupt during execution, and the first interrupt blocker is configured to output the primary interrupt to the synchronizing information generator when the primary interrupt is inputted during execution of the first instruction by the synchronizing information generator and not to output the primary interrupt to the synchronizing information generator when the primary interrupt is inputted during execution of the second instruction by the synchronizing information generator.

3. The fault tolerant system of claim 2, wherein the primary interrupt includes a first interrupt accepted by the first instruction and a second interrupt not accepted by the first instruction, and the first interrupt blocker is configured to block the second interrupt regardless of which instruction is being executed by the synchronizing information generator and to block the first interrupt during execution of the second instruction by the synchronizing information generator.

4. The fault tolerant system of claim 1, wherein the synchronizing information includes information specifying the bytecode executed by the synchronizing information generator.

5. The fault tolerant system of claim 2, wherein the synchronizing information includes information specifying the bytecode executed by the synchronizing information generator.

6. The fault tolerant system of claim 3, wherein the synchronizing information includes information specifying the bytecode executed by the synchronizing information generator.

7. The fault tolerant system of claim 1, wherein the bytecode includes an input instruction for acquiring data from an external location, and the synchronizing information generator is configured to output information related to the data acquired by executing the input instruction as the synchronizing information.

8. The fault tolerant system of claim 2, wherein the bytecode includes an input instruction for acquiring data from an external location, and the synchronizing information generator is configured to output information related to the data acquired by executing the input instruction as the synchronizing information.

9. The fault tolerant system of claim 3, wherein the bytecode includes an input instruction for acquiring data from an external location, and the synchronizing information generator is configured to output information related to the data acquired by executing the input instruction as the synchronizing information.

10. The fault tolerant system of claim 4, wherein the bytecode includes an input instruction for acquiring data from an external location, and the synchronizing information generator is configured to output information related to the data acquired by executing the input instruction as the synchronizing information.

11. The fault tolerant system of claim 5, wherein the bytecode includes an input instruction for acquiring data from an external location, and the synchronizing information generator is configured to output information related to the data acquired by executing the input instruction as the synchronizing information.

12. The fault tolerant system of claim 6, wherein the bytecode includes an input instruction for acquiring data from an external location, and the synchronizing information generator is configured to output information related to the data acquired by executing the input instruction as the synchronizing information.

13. The fault tolerant system of claim 1, wherein the primary interrupt includes a timer process.

14. The fault tolerant system of claim 2, wherein the primary interrupt includes a timer process.

15. The fault tolerant system of claim 3, wherein the primary interrupt includes a timer process.

16. The fault tolerant system of claim 1, wherein the primary interrupt includes a network transmission and reception process.

17. The fault tolerant system of claim 2, wherein the primary interrupt includes a network transmission and reception process.

18. The fault tolerant system of claim 3, wherein the primary interrupt includes a network transmission and reception process.

* * * * *